United States Patent [19]
Sung et al.

[11] 4,124,121
[45] Nov. 7, 1978

[54] DOCUMENT SORTER SYSTEM HAVING INTERCHANGEABLE POCKET MODULES

[75] Inventors: Benjamin T. Sung, Southfield; Richard C. Lumpkin, Laingsburg, both of Mich.

[73] Assignee: Burroughs Corporation, Detroit, Mich.

[21] Appl. No.: 774,681

[22] Filed: Mar. 7, 1977

[51] Int. Cl.² ............................................. B07C 3/18
[52] U.S. Cl. ...................................... 209/583; 271/64
[58] Field of Search ................... 209/73, 74 R, 74 M, 209/111.7 R, 111.7 T, 111.8; 271/64

[56] References Cited
U.S. PATENT DOCUMENTS

| 3,270,882 | 9/1966 | Perotto | 209/74 R |
| 3,889,811 | 6/1975 | Yoshimura | 209/74 M |
| 3,904,516 | 9/1975 | Chiba et al. | 209/74 M |

*Primary Examiner*—Joseph J. Rolla
*Attorney, Agent, or Firm*—Robert L. Kaner; Robert C. J. Tuttle; Carl Fissell, Jr.

[57] ABSTRACT

A document sorting system includes a concatenation of document receiving modules, each module having a plurality of pockets and being distinguishable from another module only by its position in the concatenation. A coding circuit is included in each module to generate a unique identifying code for each of the plurality of pockets in the module. The identifying code has a first binary portion based on the position of the module in the concatenation, and a second portion based on the position of the pocket in the module.

16 Claims, 4 Drawing Figures

FIG. 2.

| MODULE | POCKET IDENTIFICATION | POCKET CODE | | | | | |
|---|---|---|---|---|---|---|---|
| | | MODULE | | | | POCKET | |
| | | $b_6$ | $b_5$ | $b_4$ | $b_3$ | $b_2$ | $b_1$ |
| 1 | (REJECT) | 0 | 0 | 0 | 0 | 0 | 0 |
| 1 | 1 | 0 | 0 | 0 | 0 | 0 | 1 |
| 1 | 2 | 0 | 0 | 0 | 0 | 1 | 0 |
| 1 | 3 | 0 | 0 | 0 | 0 | 1 | 1 |
| 2 | 4 | 0 | 0 | 0 | 1 | 0 | 0 |
| 2 | 5 | 0 | 0 | 0 | 1 | 0 | 1 |
| 2 | 6 | 0 | 0 | 0 | 1 | 1 | 0 |
| 2 | 7 | 0 | 0 | 0 | 1 | 1 | 1 |
| 3 | 8 | 0 | 0 | 1 | 0 | 0 | 0 |
| 3 | 9 | 0 | 0 | 1 | 0 | 0 | 1 |
| 3 | 10 | 0 | 0 | 1 | 0 | 1 | 0 |
| 3 | 11 | 0 | 0 | 1 | 0 | 1 | 1 |
| 16 | 60 | 1 | 1 | 1 | 1 | 0 | 0 |
| 16 | 61 | 1 | 1 | 1 | 1 | 0 | 1 |
| 16 | 62 | 1 | 1 | 1 | 1 | 1 | 0 |
| 16 | 63 | 1 | 1 | 1 | 1 | 1 | 1 |

DOCUMENT SORTER SYSTEM HAVING INTERCHANGEABLE POCKET MODULES

BACKGROUND OF THE INVENTION

1. Field of the Invention

This invention relates to a document sorting system, and more particularly, to a system incorporating a concatenated group of pocket modules for receiving the sorted documents.

2. Description of the Prior Art

A document sorting system sorts documents into discrete groups based on certain identifying indicia or information encoded on the documents. A common document sorter configuration includes a hopper which receives as input a stack of unsorted documents. The documents are fed from the hopper in serial order through a read station where the encoded indicia or information is sensed. The sensed information is transmitted to a control unit that correlates the information with the identification of the group to which each document belongs. Each group is represented as a pocket or bin in a document receiving station. Each pocket branches off a common document transport path. A diverter gate is provided at the mouth of each pocket and may assume an open or closed position depending on whether or not a document is intended to be received in its respective pocket. If the diverter gate is closed, the document is allowed to pass the pocket and continue along the common transport track; if the gate is open, the document will be diverted into the pocket.

The number of pockets or bins required varies from one application to the next depending upon the number of discrete groups. A convenient solution for providing the required number of pockets is to concatenate a plurality of pocket modules where each module contains a uniform plurality of pockets. When additional pockets are needed, one or more modules are added to the concatenation; and when fewer pockets are needed, modules are simply removed. Modules with four pockets each are common in the industry.

When a module is placed in or added to a concatenation, each pocket of the module must have a unique identification in the concatenation so that it can be accessed by the control unit. As may be readily deduced, the identification of a pocket is dependent upon the relative position of its associated module in the concatenation. The fact that module position must be taken into account in assigning pocket identification is a basic limitation on the otherwise free interchangeability of modularity of pocket modules.

In the prior art, a common way of assigning a unique identification code to each pocket of the module was to set a group of mechanical switches in the module to create a binary identification code for each pocket. The switches were generally contained within the module and manually set and reset each time the module would assume a different relative position in the concatenation.

The setting and resetting of switches provides a workable means for the assignment of a unique identifying code for each pocket in the concatenation. However, in practice it generally requires that the back panel of the module be removed, the operator reset the switches, and then replace the back panel before the module becomes operative. This technique is clostly in terms of time and operator effort. It also introduces the possibility of error due to human intervention.

Against this background, it would be clear improvement over the prior art to provide a pocket module that independently generates a unique identifying code for each pocket of the module and eliminates costly and error-prone manual operations. Such a module would be fully interchangeable and plug-compatible without regard to its previous position in a concatenation and provide truely modular capability.

BRIEF SUMMARY OF THE INVENTION

The present invention is a document sorting system that includes pocket modules having the capability to independently generate a unique identifying code for each pocket of the module in order to provide free and total interchangeability of modules without operator involvement.

Broadly, each module is provided with a coding circuit that generates a unique two-part identifying code for each pocket of the module. The first part of the code is based upon the position of the module in the concatenation. Specifically, the coding circuit receives as input the first part of the identifying code from the preceding module and modifies it, either by incrementation or otherwise, to generate the first part of the code for the present module. The second part of the code is based upon the position of the pocket in the module. This part will be recurrent for each module and may be generated by a self-contained circuit that needs no external input.

In the preferred embodiment, the pocket identification code will be in six bit binary form, with the four leftmost bits allocated for the first part of the code, and the two rightmost bits allocated for the identification of the pockets in the module. In this scheme, the concatention can include up to sixteen modules with each module having four pockets, for an overall total of 64 pockets.

The module is further provided with a storage register for receiving a pocket select code which identifies the pocket for which a particular document is intended. The pocket select code is compared with the identification code for each pocket and a favorable comparison will enable the gate associated with the pocket to close and divert that particular document into the pocket.

The invention will be more fully appreciated by reference to the following detailed description of a specific embodiment which is to be taken in conjunction with the drawing.

BRIEF DESCRIPTION OF THE DRAWING

FIG. 2 is a table representing the six bit binary code format used for identifying each pocket in the concatenation of FIG. 1;

DETAILED DESCRIPTION OF THE SPECIFIC EMBODIMENT

Figure 1:
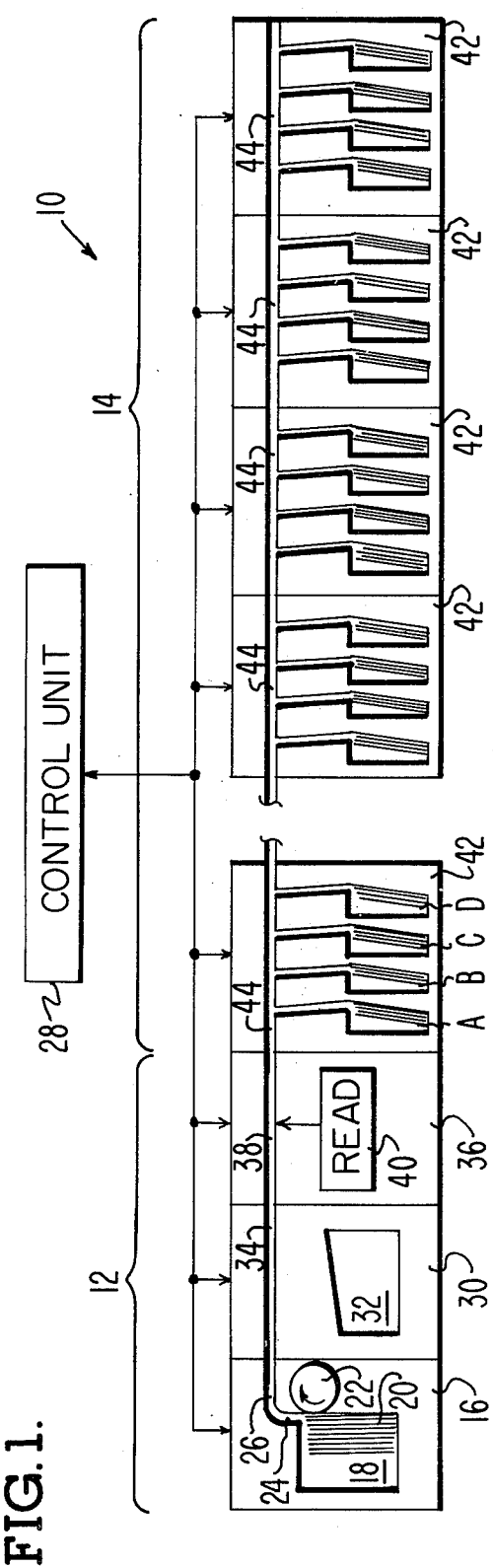
FIG. 1 is a schematic representation of a document sorter system having a plurality of concatenated pocket modules.

A document sorting system exemplary of the type of system for which the present invention is suited is shown generally at 10 in FIG. 1. For purposes of discussion, the system 10 is broadly divided into two stages; a processing stage 12, and a document receiving and storing stage 14. Each stage is briefly described as follows.

The document processing stage 12 includes a feed station 16. The feed station has a hopper 18 that receives a stack of unsorted documents 20. Each of the documents 20 is presumed to have identifying information encoded on it that relates to a discrete group to which the document belongs. Documents are serially fed from the hopper 18 by means of a feed wheel 22 into a mouth 24 and enter the first segment 26 of a continuous document transport track. The feed station 16 operates under the supervision of a control unit 28 which is in bilateral communication with the feed station.

An encoding station 30 is positioned adjacent the feed station 16. The encoding station receives each serially fed document in a connecting segment 34 of the continuous transport track. In the encoding station 30 a document may be held and viewed by an operator so that additional information may be formally encoded by means of a keyboard 32. An example of such may be a bank check, wherein information as to the drawer's bank and account number have been pre-encoded, but the amount of the check needs to be manually encoded by an operator. The encoding station 30 operates under the supervision of and is in bilateral communication with the control unit 28. The presence of the encoding station 30 in the processing stage 12 is not a requirement of the present invention; however, the encoding station is briefly described as it is commonly included in document sorter configurations.

A document read station 36 is positioned adjacent the encoding station 30. The read station receives documents in serial order in a third segment 38 of the continuous document transport path. The read station 36 includes a read head 40 which senses the encoded information on each document and transmits the sensed information to the control unit 28. The sensed information is translated into a code representative of the discrete group to which the respective document belongs. The coding scheme of the present invention will hereinafter be more fully discussed.

The document receiving and storing stage 14 comprises a plurality to concatenated pocket modules 42. Each module is physically identical with every other module in the concatenation and distinguishable from another module only by its relative position or order in the concatenation. The number of modules required is in direct relation to the number of discrete groups into which the documents are to be sorted. Each module has a segment of document transport track 44 that connects with the segment of each neighboring module, such that each segment 44 represents a succeeding segment in the overall document transport track. The first module, of course, has its track segment aligned and compatible with the track segment 38 of the read station 36.

In the preferred embodiment, each pocket module 42 has four document receiving pockets or bins, designated as A, B, C and D in the first module of the concatenation, that branch off the track segment 44. Each pocket has a one-to-one correspondence with one of the discrete document groups. At the mouth of each branch is a diverter gate, not shown, but well known in the art, which, when closed, allows the document to bypass the pocket; and when opened, diverts the document into the pocket. Diverter gates of this class are commonly actuated by a solenoid or stepper motor that responds to an enabling signal. Each pocket module 42 operates under the supervision of and is in bilateral communication with the control unit 28.

In order for the control unit 28 to access a pocket, it is necessary that each pocket have a unique identifying code in the concatenation. FIG. 2 represents a coding scheme designed for this purpose.

More specifically, in the preferred embodiment of the invention a six-bit, binary code is assigned to each pocket of the concatenation to uniquely identify it within the concatenation. This pocket code is illustrated in the rightmost columns of FIG. 2. The pocket with which each pocket code is associated is shown in cardinal number form in the center column headed Pocket Identification.

The pocket code is broken down into two parts: a first part relating to the relative position or order in the concatenation of the module which contains the pocket; and a second part relating to the position of the pocket within the module. The first part of the code uses the four leftmost bits of the six bit binary code. This will allow for up to 16 modules in the concatenation, which is a practical upper limit. However, because there is no theoretical upper limit on the number of modules that may be used, the first part of the binary code could be increased from 4 bits to accommodate modules in excess of 16.

The second part of the pocket code is allocated the two rightmost bits of the six-bit, binary code. This will allow for a module having up to four pockets, which is common in the industry. Of course, the second part of the pocket code may be increased beyond 2 bits for modules having in excess of four pockets. The second part of the pocket code goes through a recurring pattern for each module. In other words, the second part of the code is insensitive to the position of the module in the concatenation and may be generated by a self-contained circuit without need of this information.

Accordingly, the six-bit, binary pocket code illustrated in FIG. 2 will accommodate up to sixteen modules with four pockets in each module to provide for an overall total of 64 pockets. One pocket may arbitrarily be designated as a reject pocket, e.g. pocket 0, to receive documents that are rejected due to non-readable characters, improper document handling or spacing, or similar type malfunctions.

A major advantage of the present invention is the provision of a coding circuit in each module 42 that generates a unique identifying code for each pocket of the module to identify the position of the pocket in the concatenation and allow it to be accessed by the control unit of the system. The present invention is specifically advantageous in that the coding circuit is operative without regard to the previous position of the module in an earlier concatenation. This advantage allows each module to be completely plug-compatible with adjacent modules and operative without operator intervention to reset mechanical switches or like encoding devices.

Figure 3:
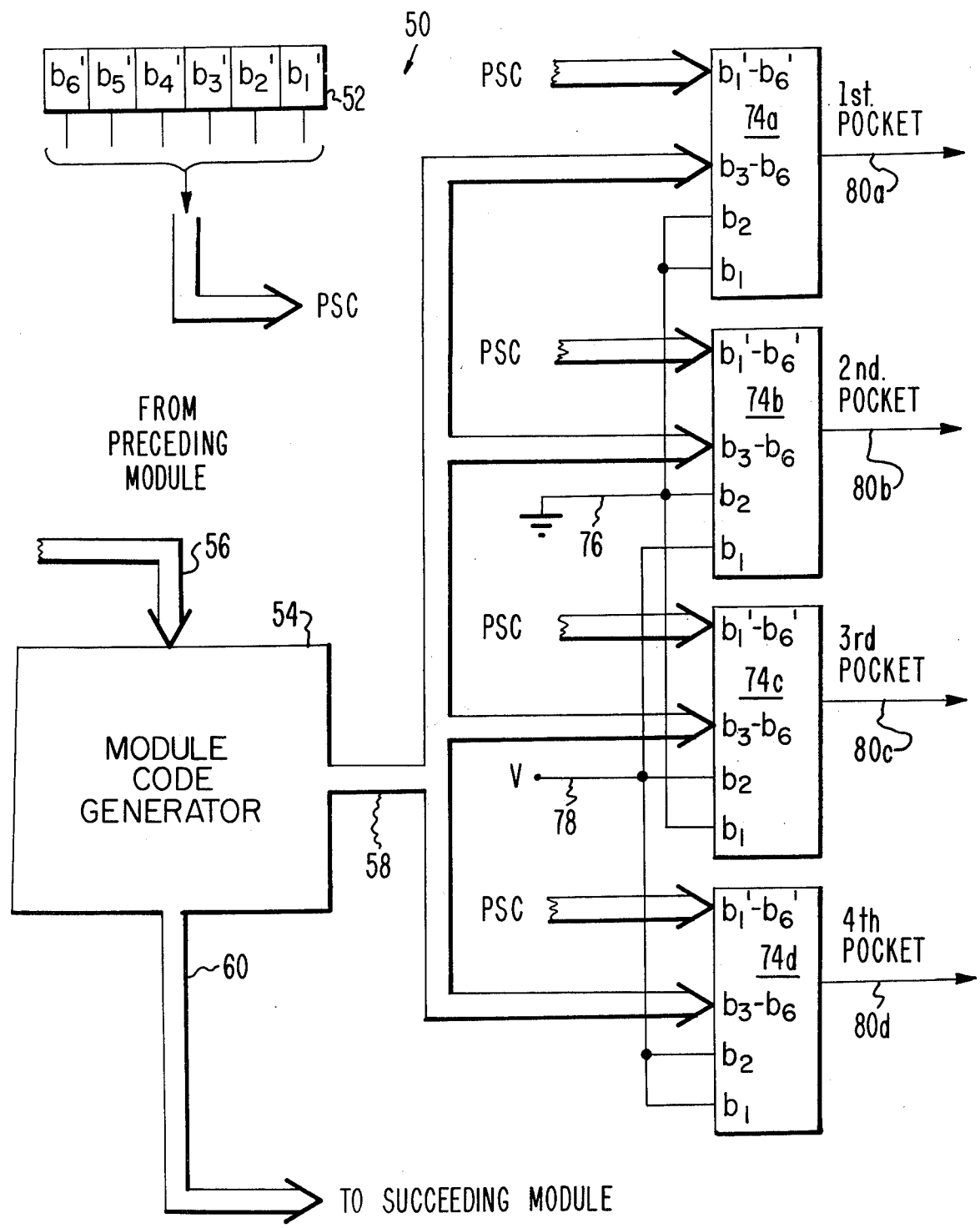
FIG. 3 is a schematic representation of the novel circuitry for generating a pocket identification code and comparing it with a pocket select code to determine if a particular pocket is to be opened to receive a document.

A coding circuit providing these advantages is shown generally at 50 in FIG. 3. The coding circuit 50 includes a pocket select register 52 which receives and stores a six-bit, binary code loaded from the control unit 28, and which will hereinafter be referred to as the Pocket Select Code (PSC) that designates the pocket for which a particular document is designated. The six-bit, binary code is patterned after the pocket identification code illustrated in FIG. 2. Specifically, the four leftmost bits ($b'_6$, $b'_5$, $b'_4$, and $b'_3$) of the PSC relate to the module containing the intended pocket, and the two rightmost bits ($b'_2$ and $b'_1$) of the PSC relate to the position of the pocket in the module.

The coding circuit 50 further comprises a module code generator 54 that generates a unique identifying code for the module of the concatenation in accordance with the coding scheme illustrated in FIG. 2 and hereinbefore discussed in relation therewith. The module code generator 54 receives input from the preceding module in the concatenation through cable 56. It has a first output which provides a pocket identification code on cable 58 for each of the pockets of the module. A second output on cable 60 goes to the succeeding module in the concatenation.

Figure 4:
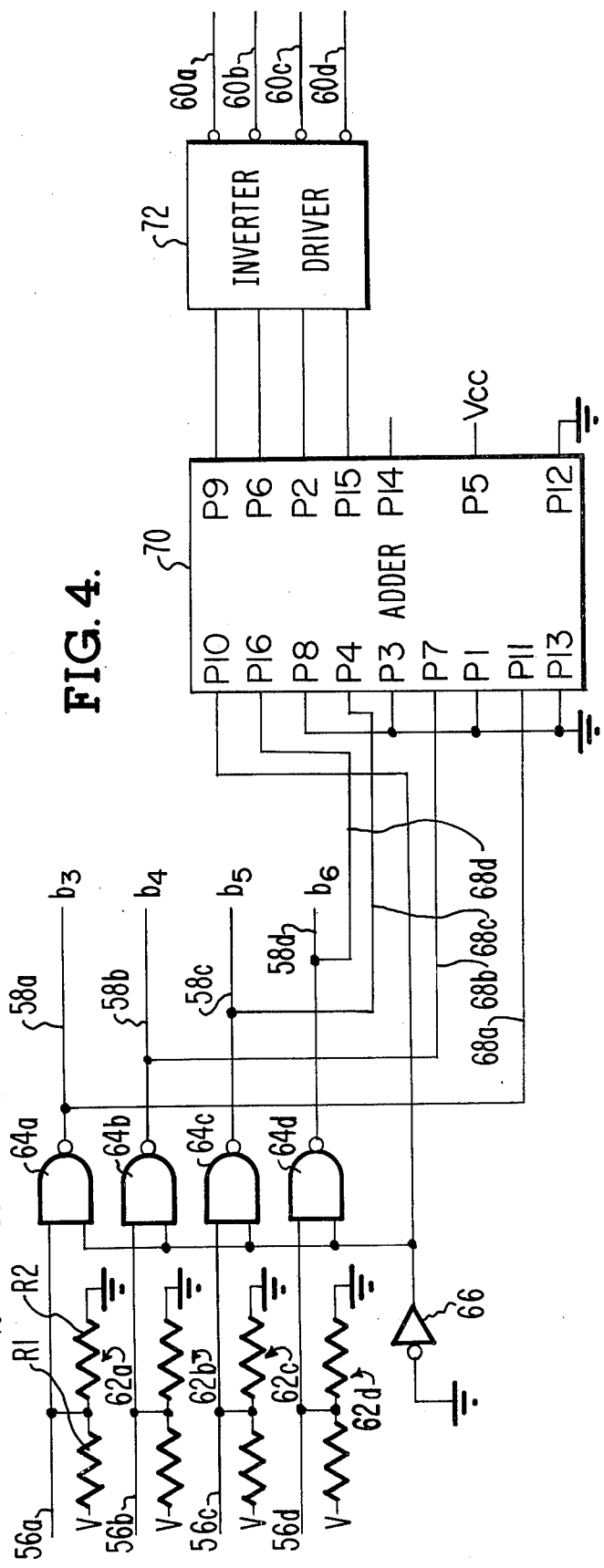
FIG. 4 is a more detailed schematic representation of the module code generator of FIG. 3.

The module code generator 54 is shown in greater detail in FIG. 4. The input cable 56 comprises four lines 56a, b, c, and d. These four lines represent the four-bit, first part of the pocket identification code, i.e. that part of the code relating to the position of the module in the concatenation. In the case of the first module in the concatenation, these lines are left floating for purposes to be hereinafter made apparent.

Each line 56a, b, c, and d is tied to the output of a respective voltage divider network 62a, b, c, and d. Each voltage divider network, as exemplified by network 62a comprises a voltage source V, a first dropping resistor R1 and a second dropping resistor R2 that has its free end grounded. If for present purposes we may assume that the circuit of FIG. 4 uses positive logic, then an exemplary value for V is 5 volts, with R1 and R2 having ohmic values of 220 and 300, respectively.

Each of the input lines 56a, b, c, and d represent one input to a corresponding group of NAND gates 64a, b, c, and d. The other input to each of the NAND gates is taken from the output of an inverter 66 that has its input grounded such that the output is constantly high or effectively held at a binary 1.

The output of each of the NAND gates represents the first part of the pocket code of the present module as identified by lines 58a, b, c, and d which collectively make up output 58 from FIG. 3. The signals on lines 58a, b, c, and d are taken off by respective lines 68a, b, c, and d and provided as input to an adder 70. Similarly, the constantly high output of inverter 66 is input to the adder 70. The function of the adder 70 is to receive the four-bit, first part of the pocket code that represents the position of the module in the concatenation and increment it by one binary unit to generate the code for the immediately succeeding module. An adder which has been found suitable in a practical embodiment and is illustrated herein is a type TTL SN7483A, also known as a four-bit binary full adder. The structure and performance characteristics of this type adder are well documented in the art and may for example be found in Texas Instrument's Bulletin No. DL-S 7211853, Dec. 1972. For purposes of the present invention, pins P11, P7, P4 and P16 receive as inputs lines 68a, b, c, and d. The output of inverter 66 is input at pin P10. Pins P8, P3, P1 and P13 are grounded. Pin P5 receives as input the voltage source $V_{cc}$. Pin P12 is normally grounded. Pin P14 is unneeded and allowed to float. The outputs of the adder 70 are taken off pins P9, P6, P2 and P15. The four-bit output off these pins is a one-unit incrementation of the four-bit input on lines 68a, b, c, and d. The output of the adder 70 is directly input to an inverter driver 72 wherein the signals are sent to the succeeding stage. The outputs 60a, b, c, and d of inverter driver 72 are inverted before being transmitted to the next module where they will represent the inputs 56a, b, c, and d for the following module.

In the case of the first pocket module, lines 56a, b, c, and d are floated and have no signal on them. The input to the respective NAND gates 64a, b, c, and d will be determined by the output of the voltage divider network 62a, b, c, and d. If we identify any signal below 0.4 volt as low and any signal above 2.0 volts as high, then selecting V = 5 volts, R1 = 220 ohms, and R2 = 330 ohms, will cause the output of the voltage divider network to exceed 2.0 volts and the signal to each of the NAND gates will be uniformly high, or a binary one. The other input to each of the NAND gates from inverter 66 is constantly high. Accordingly, the output of each of the NAND gates will be low or binary 0. Therefore, in the case of the first module, the signals on lines 58a, b, c, and d will be low, yielding a pocket code for each of the four pockets of the first module having a first part that is all binary 0. This is in agreement with the coding scheme hereinbefore illustrated and discussed in connection with FIG. 2.

The signals on lines 68a, b, c, and d will similarly be low. The output of the adder 70 on pins P9, P6, P2, and P15 will be the same as the input incremented by a binary unit. The output of the adder 70 is then sent to the succeeding module by the inverter driver 72.

Considering next the coding circuit for the second pocket module in the concatenation, it can be shown by inductive logic that each coding circuit will generate an updated code based on the code of the immediately preceding module. In the case of the second module, the signal on line 56a will be low and the signals on lines 56b, c, and d will be high. In the case of line 56a, the voltage divider 62a will not override the low signal because the output of the divider is effectively grounded by the low signal at output 60a of the immediately preceding module. Accordingly, the input to NAND gate 64a will be low, and the inputs to NAND gates 64b, c, and d will be high. Again, the second input to each of the NAND gates from the output of inverter 66 is constantly high. With these inputs, the output of NAND gate 64a will be high, and the outputs of NAND gates 64b, c, and d will be low. This is in agreement with the four-bit first part of the pocket code for the second module as shown in the coding scheme of FIG. 2. If this procedure is followed through for each succeeding module, it will be seen that the module code generator 54 of FIG. 3 will generate a four-bit first part pocket code for each module in agreement with the coding scheme illustrated in FIG. 2.

Referring again to FIG. 3, each of the pockets of a module has associated with it a comparator 74a, b, c, and d. Each comparator compares the pocket select code (PSC) with the pocket code for that pocket. If a favorable comparison is made, the comparator output goes high and enables the gate associated with the pocket to open and divert the document having that particular PSC to be received within the pocket.

The first part of the pocket code that uniquely identifies a pocket is taken from the output 58 of the module code generator 54 as hereinbefore discussed. The second part of the code relates to the position of the pocket in the module. As noted earlier, and is readily deducible by inspection of FIG. 2, the second part of the pocket code demonstrates a recurring pattern for each module. Therefore, the second part of the pocket code can be generated by a self-contained circuit without external input. This is accomplished by hard-wiring the $b_1$ and $b_2$ inputs on each of the comparators 74a, b, c, and d in accordance with the recurring pattern of FIG. 2. Specifically, a grounded line 76 representing a low binary signal is input to $b_2$ and $b_1$ of comparator 74a; $b_2$ of comparator 74b; and $b_1$ of comparator 74c. A high signal line 78, nominally at 5 volts, is input to $b_1$ of comparator 74b; $b_2$ of comparator 74c; and $b_1$ and $b_2$ of comparator 74d. This wiring configuration represents a self-contained circuit that will generate the second part of the pocket identification code.

The coding circuit 50 of the present invention when incorporated in a pocket module provides for total interchangeability of modules. In other words, a module may be inserted in a concatenation without regard to its relative position in an earlier concatenation. No resetting of switches or other similar-type, manual operations are required. The present invention achieves what is known in the industry parlance as plug-compatability.

The invention has been described in an illustrative manner, and it is to be understood that the terminology which has been used is intended to be in the nature of words of description rather than limitations.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A document sorter for sorting a stack of documents into a plurality of discrete groups in accordance with information encoded on each of the documents relating to its group identification, comprising:
    feed means for receiving the documents and feeding them in serial order into a first segment of a continuous document transport track;
    read means for reading the encoded information on each document as it passes through a second segment of the continuous transport track;
    document receiving means for receiving and storing each document in accordance with its group identification, the document receiving means being defined to include a plurality of concatenated pocket modules, each of the modules forming a successive segment of the continuous transport track and distinguishable from another module only by its position in the concatenation, each of the modules further having a plurality of pockets, each of the pockets having a one-to-one correspondence with one of the plurality of discrete groups and having a unique identification code in the concatenation of modules, each pocket further having associated with it a gate actuatable between a closed position and an open position to close and open the pocket;
    document transport means for transporting each of the documents along the continuous document transport track;
    control means, responsive to the read means, for receiving the information encoded on each of the documents and correlating it with a pocket select identification code; and
    each module of said document receiving means further comprising:
        coding circuit means for generating the unique identification codes corresponding to each of the pockets of the module, the identification code having a first part relating to the position of the module in the concatenation and a second part relating to the position of the pocket in the module, said coding circuit means being defined to include
            first means for generating the first part of the identification code based on the position of the module in the concatenation, and
            second means for generating the second part of the identification code for each pocket in the module based on the position of the pocket in the module;
        storage means associated with each of the pockets of the module for receiving and storing the pocket select code representative of the pocket for which a particular document is designated; and
        comparator means associated with each pocket of the module for comparing the pocket select code with the unique identification code for the pocket and enabling the gate to open upon favorable comparison.

2. The document sorter as defined in claim 1, wherein the unique identifying code is defined by a set of binary digits and the first means includes adding means for incrementing by a binary unit the first code portion from an immediately preceding module to generate the first code portion for an immediately succeeding module.

3. The document sorter as defined in claim 1, wherein the second means comprises self-contained circuit means for generating a second code portion that is recurrent for each module.

4. For use in a sorter module of the class having a plurality of pockets and adaptable to be included in a concatenation of like sorter modules forming a part of a document sorting system, each such sorter module comprising:
    coding circuit means for generating a code for each of the plurality of pockets of the module that uniquely identifies the pocket in the concatenation comprising:
        first means for generating a first code portion based on the position of the module in the concatenation, and
        second means for generating a second code portion, combineable with the first code portion, for each pocket in the module based on the position of the pocket in the module;
    storage means for receiving and storing a pocket select code representative of the pocket for which a particular document is designated; and
    comparator means associated with each of the plurality of pockets of the module, for receiving and comparing the pocket identification code for a pocket with the pocket select code and outputting an enabling signal upon a favorable comparison to enable the opening of the pocket.

5. The coding circuit means as defined in claim 4, wherein the pocket code is defined by a set of binary digits and the first means includes adding means for incrementing by a binary unit the first code portion from an immediately preceding module to generate the first code portion for an immediately succeeding module.

6. The coding circuit means as defined in claim 5, wherein the second means comprises self-contained circuit means for generating a second code portion that is recurrent for each module.

7. An improved document sorter module of the class adaptable to being concatenated with like sorter modules to form part of a document sorting system, the module having a transport track with a plurality of document receiving pockets branching from the transport track, each pocket being opened for the receipt of a document by the actuation of a diverter gate, the improvement to the sorter module comprising the added combination of:

coding circuit means for generating a code for each pocket of the module to uniquely identify the pocket in a concatenation of like modules, the coding circuit means being defined to include,
first means for generating a first code portion based on the position of the module in the concatenation, and
second means for generating a second code portion, combineable with the first code portion, for each pocket in the module based on the position of the pocket in the module;
storage means for receiving and storing a pocket select code representative of the pocket for which a particular document is designated; and
comparator means associated with each pocket of the module, for receiving and comparing the pocket identification code for a pocket with the pocket select code and outputting an enabling signal upon a favorable comparison to enable the opening of a pocket.

8. The improved document sorter module as defined in claim 7, wherein the pocket identifying code is defined by a set of binary digits and the first means includes adding means for incrementing by a binary unit the first code portion from an immediately preceding module to generate the first code portion for an immediately succeeding module.

9. The improved document sorter module as defined in claim 7, wherein the second means comprises self-contained circuit means for generating a second code portion that is recurrent for each module.

10. A document sorter for sorting a stack of documents into a plurality of discrete groups in accordance with information encoded on each of the documents relating to its group identification, comprising:

feed means for receiving the documents and feeding them in serial order into a first segment of a continuous document transport track;
read means for reading the encoded information on each document as it passes through a second segment of the continuous transport track;
document receiving means for receiving and storing each document in accordance with its group identification, the document receiving means being defined to include a plurality of concatenated pocket modules, each of the modules forming a successive segment of the continuous transport track and distinguishable from another module only by its position in the concatenation, each of the modules further having a plurality of pockets, each of the pockets having a one-to-one correspondence with one of the plurality of discrete groups and having a unique binary identification code in the concatenation of modules, each pocket further having associated with it a gate actuatable between a closed position and an open position to close and open the pocket;
document transport means for transporting each of the documents along the continuous document transport track;
control means, responsive to the read means, for receiving the information encoded on each of the documents and correlating it with a pocket select identification code;
coding circuit means associated with each pocket module for generating the unique binary identification codes corresponding to each of the pockets of the module, the identification code having a first part relating to the position of the module in the concatenation and a second part relating to the position of the pocket in the module, the coding circuit means being defined to include,
first means for generating the first part of the identification code based on the position of the module in the concatenation, said first means including adding means for incrementing by a binary unit the first code portion from an immediately preceding module to generate the first code portion for an immediately succeeding module, and
second means for generating the second part of the identification code for each pocket in the module based on the position of the pocket in the module; and
comparator means associated with each pocket for comparing the pocket select identification code with the unique identification code for the pocket and enabling the gate to open upon a favorable comparison.

11. The document sorter as defined in claim 10, wherein the second means comprises self-contained circuit means for generating a second code portion that is recurrent for each module.

12. For use in a sorter module of the class having a plurality of pockets and adaptable to be included in a concatenation of like sorter modules forming a part of a document sorting system:

a coding circuit for generating a binary code for each of the plurality of pockets of the module that uniquely identifies the pocket in the concatenation comprising:
first means for generating a first code portion based on the position of the module in the concatenation, said first means including adding means for incrementing by a binary unit the first code portion from an immediately preceding module to generate the first code portion for an immediately succeeding module; and
second means for generating a second code portion, combineable with the first code portion, for each pocket in the module based on the position of the pocket in the module.

13. The coding circuit as defined in claim 12, wherein the second means comprises self-contained circuit means for generating a second code portion that is recurrent for each module.

14. An improved document sorter module of the class adaptable to being concatenated with like sorter modules to form part of a document sorting system, the module having a transport track with a plurality of document receiving pockets branching from the transport track, each pocket being opened for the receipt of a document by the actuation of a diverter gate, the improvement comprising the added combination of:

a coding circuit for generating a binary code for each pocket of the module to uniquely identify the pocket in a concatenation of like modules, the coding circuit being defined to include, first means for generating a first code portion based on the position of the module in the concatenation, said first means including adding means for incrementing by a binary unit the first code portion from an immediately preceding module to generate the first code portion for an immediately succeeding module, and second means for generating a second code portion, combineable with the first code portion, for each pocket in the module based on the position of the pocket in the module;

storage means for receiving and storing a pocket select code representative of the pocket for which a particular document is designated; and comparator means associated with each pocket of the module, for receiving and comparing the pocket identification code for a pocket with the pocket select code and outputting an enabling signal upon a favorable comparison to enable the opening of a pocket.

15. The improved document sorter module as defined in claim 14, wherein the second means comprises self-contained circuit means for generating a second code portion that is recurrent for each module.

16. An improved document sorter module of the class adaptable to be concatenated with like sorter modules to form part of a document sorting system, the module having a transport track with a plurality of document receiving pockets branching from the transport track; each pocket being opened for the receipt of a document by the actuation of a diverter gate, the module having the capability to generate unique identification codes for the pockets therein, the improvement to the document sorter module comprising the combination of:

coding circuit means, said coding circuit means receiving as an input electronic signals from the immediately preceding module of the concatenation, which receiving signals indicate pocket coding in the immediately preceding module of the concatenation; said coding circuit means being responsive to said received signals for generating unique identification codes for pockets of the present module of the concatenation; and said coding circuit means providing as an output to the immediately succeeding module of the concatenation electronic signals which indicate pocket coding in the present module;

storage means for receiving and storing a pocket select code representative of the pocket for which a particular document is designated; and comparator means, associated with each pocket of the module, for receiving and comparing the pocket identification code with the pocket select code and outputting an enabling signal upon a favorable comparison to enable the opening of a pocket.

* * * * *